(No Model.)
J. W. COOK.
POTATO DIGGER.
No. 463,943. Patented Nov. 24, 1891.
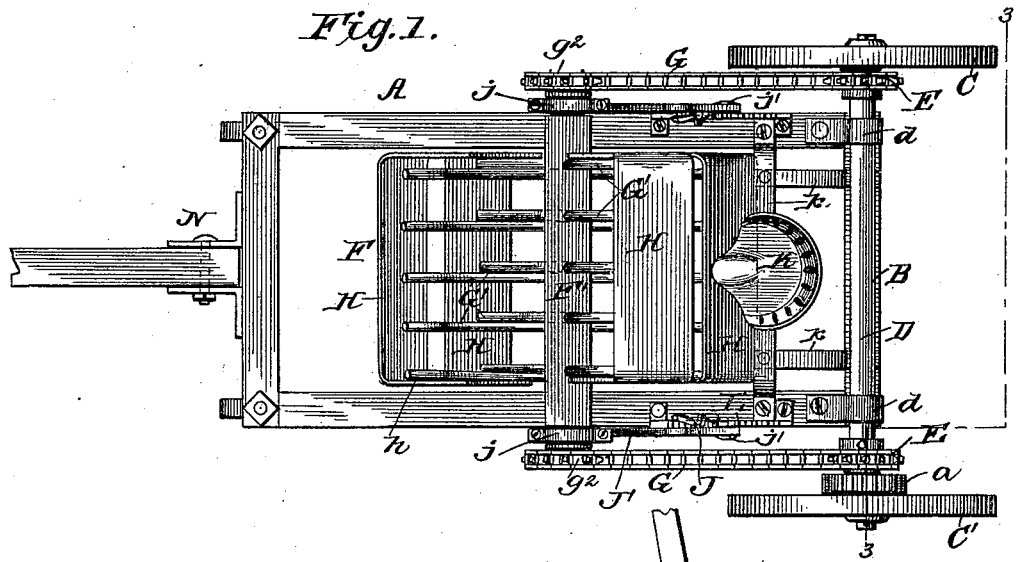
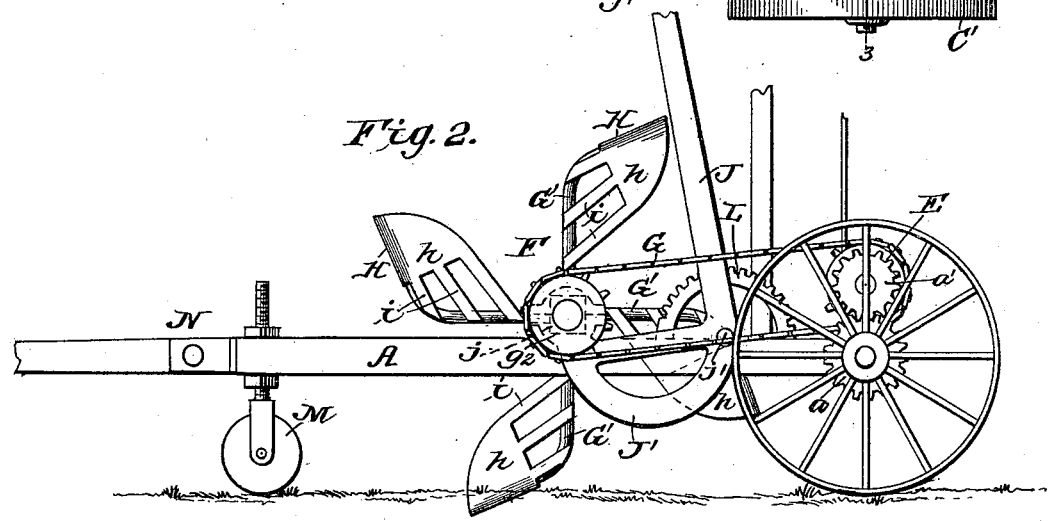
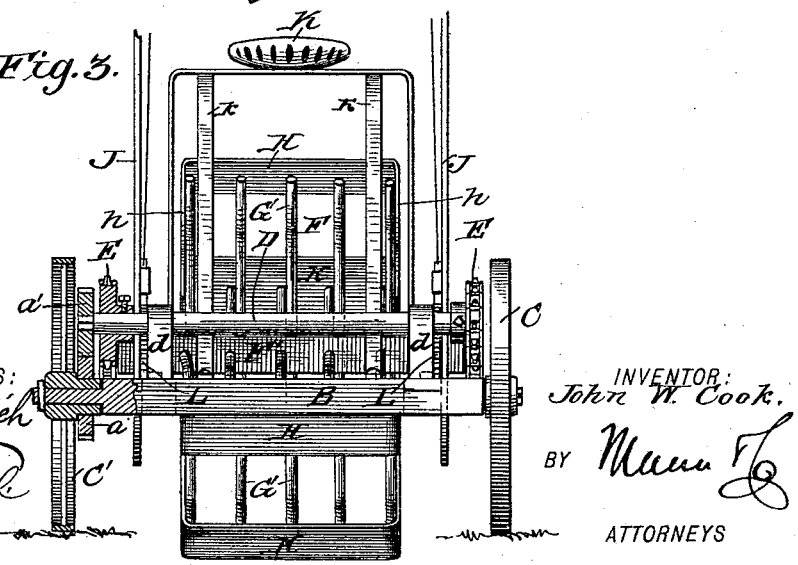
WITNESSES:
Fred G. Dieterich
M. B. Blondel
INVENTOR:
John W. Cook.
BY Munn & Co.
ATTORNEYS

UNITED STATES PATENT OFFICE.

JOHN W. COOK, OF JEFFERSON, OREGON.

POTATO-DIGGER.

SPECIFICATION forming part of Letters Patent No. 463,943, dated November 24, 1891.

Application filed March 25, 1891. Serial No. 386,353. (No model.)

*To all whom it may concern:*

Be it known that I, JOHN W. COOK, residing at Jefferson, in the county of Marion and State of Oregon, have invented certain new and useful Improvements in Potato-Diggers, of which the following is a specification.

My invention has for its object to provide a potato-digger which will be simple and cheap in construction, easy to manipulate, and effective for its desired purpose; and it consists in the peculiar combination and novel arrangement of parts, all of which will hereinafter be fully described in the annexed specification, and particularly pointed out in the claims, reference being had to the accompanying drawings, in which—

Figure 1 is a top plan view of my improved digger. Fig. 2 is a side view; and Fig. 3, a detail cross-section on the line 3 3, Fig. 1.

In the accompanying drawings, A indicates the main frame, rectangular in shape, the rear cross-bar of which constitutes the main axle B, upon which the drive-wheels C C' are mounted in the ordinary manner, one of such wheels C' being formed with an inwardly-extending non-circular hub, upon which is fitted a cog-gear $a$, which meshes with a similar gear $a'$ on the outer end of a shaft D, journaled in bearings $d\ d$, projected up from the main axle B, said shaft being also provided with sprocket-wheels E E, as shown.

F indicates a revolving digger, which consists of the axle F', journaled in a manner presently described, the ends of which project beyond their bearings and are provided with sprocket-wheels $g^2\ g^2$, which are connected to the sprockets E E by the chains G G.

G' indicates a series of rods projected radially from the axle F', the diametrically-opposite ones having their ends curved in reverse directions, as shown, such ends terminating at and connected with the transverse horizontally-arranged metal blades or cutters H, the ends $h$ of which are turned up, forming side guides, which are connected with the rods G' by the short rearwardly-extending rods $i\ i$, as shown.

By this construction it will be observed that the revolving hoe or digger is formed of a series of radial scoops having cutting and lifting blades at their outer ends and screening portions to the rear of such blades. It will also be seen that by connecting the revolving digger to the main axle in the manner shown and described it will be revolved in a reverse direction to the movement of the machine, so as to scoop forward instead of backward, and thereby lift the dirt and potatoes up over the revolving digger-axle, sifting it through the rods G', while turning and discharging the potatoes to the rear and leaving them in a row behind.

The revolving digger is journaled for a slight vertical movement in the manner clearly shown in Figs. 2 and 3 of the drawings, by reference to which it will be seen that the axle-bearings are formed in the ends $j\ j$ of extensions J' J', formed on the outer ends of lifting-levers J J, pivoted to the sides of the frame at $j'$, said levers extending up within convenient reach of the driver's seat K, and supported upon the brace-bars $k\ k$, as shown. It will be observed that the extensions J' of the levers J are extended in the arc of a circle about the pivotal points thereof, whereby as the digger-frame is lowered for engagement with the ground the sprocket-chain will be tightened and held from slipping. The levers J are each provided with the usual spring-actuated detents, which engage the toothed segments L L, as shown.

M M indicate vertically-adjustable caster-wheels arranged at the front ends of the side bars, forming guide-wheels and supports for the forward end of the machine.

N N indicate the tongue connection secured to the front cross-bar of the frame.

From the foregoing description, taken in connection with the drawings, the advantages and operation of my improved digger will readily appear, the same serving to effectually cut the roots, sift the dirt, and separate it from the potatoes, pile them in the rear, and cleanse itself.

Having thus described my invention, what I claim, and desire to secure by Letters Patent, is—

1. The combination, with the main frame and the drive-wheels C C', of the revolving digger F, journaled between the frame A, said digger consisting of the shaft F', the radial arms G', the outer ends of which are bent inward, as shown, the transverse blades H, secured to said curved arms G', said blades H having turned-up ends $h$, whereby to form said blades H scoop-like in shape, and connections between the shaft F' and the drive-wheels, whereby to revolve the digger, substantially as shown and described.

2. The combination, with the main frame A, the drive-shaft B, wheels C C', the shaft D, carrying sprockets E and geared with the wheel C', of the adjustable levers J, pivoted at $j'$ to the frame, as shown, and formed with forward-projecting members J', carrying journal-boxes $j$, the revolving digger F, journaled in said boxes $j$ and provided with sprockets $g^2$ $g^2$, the chain connections G, and means for holding the levers J to their adjusted positions, all arranged substantially as and for the purposes described.

JOHN W. COOK.

Witnesses:
A. H. CORNELIUS,
A. RELFE.